(12) United States Patent
Klabisch et al.

(10) Patent No.: US 8,038,558 B2
(45) Date of Patent: Oct. 18, 2011

(54) CHAIN DRIVE OR RETURN ARRANGEMENT AND CHAIN ASSEMBLY AND SPROCKET EMPLOYED THEREIN

(75) Inventors: Adam Klabisch, Dortmund (DE); Gerhard Merten, Lünen (DE)

(73) Assignee: DBT GmbH (DE)

( * ) Notice: Subject to any disclaimer, the term of this patent is extended or adjusted under 35 U.S.C. 154(b) by 957 days.

(21) Appl. No.: 11/505,676

(22) Filed: Aug. 17, 2006

(65) Prior Publication Data
US 2007/0042850 A1  Feb. 22, 2007

(30) Foreign Application Priority Data

Aug. 17, 2005  (DE) .................. 20 2005 013 132 U
Jul. 3, 2006  (DE) .................. 10 2006 030 984

(51) Int. Cl.
*F16H 7/06* (2006.01)
(52) U.S. Cl. ........................ 474/155; 474/206
(58) Field of Classification Search .............. 474/152, 474/155, 156, 202, 206; 254/358, 372; 59/82, 59/84
See application file for complete search history.

(56) References Cited

U.S. PATENT DOCUMENTS

| 4,473,364 | A | * | 9/1984 | Roling ................ 474/164 |
| 4,850,942 | A | * | 7/1989 | Dalferth .............. 474/155 |
| 5,318,483 | A | * | 6/1994 | Reid et al. ............ 474/152 |
| 6,168,543 | B1 | * | 1/2001 | Matsuda .............. 474/157 |
| 6,925,794 | B2 | * | 8/2005 | Dalferth et al. ........... 59/78 |

FOREIGN PATENT DOCUMENTS

DE  196 10 935 A1  3/1996

* cited by examiner

*Primary Examiner* — Robert Siconolfi
*Assistant Examiner* — Vu Q Nguyen
(74) *Attorney, Agent, or Firm* — Baker & McKenzie LLP

(57) ABSTRACT

Chain return arrangement and sprocket and chain assembly employed therein with the bow flanks of the horizontal chain links (1) of the chain assembly (10) exhibiting a concave trough at least below an equatorial line (7) and the chain link pockets (52) of the sprocket (50) that receive the horizontal chain links at their tooth flanks (53) in the contact areas (55) to the chain links (1) having a convex crown shape to match the troughed bow flank. This significantly reduces the surface pressures between the two parts.

13 Claims, 5 Drawing Sheets

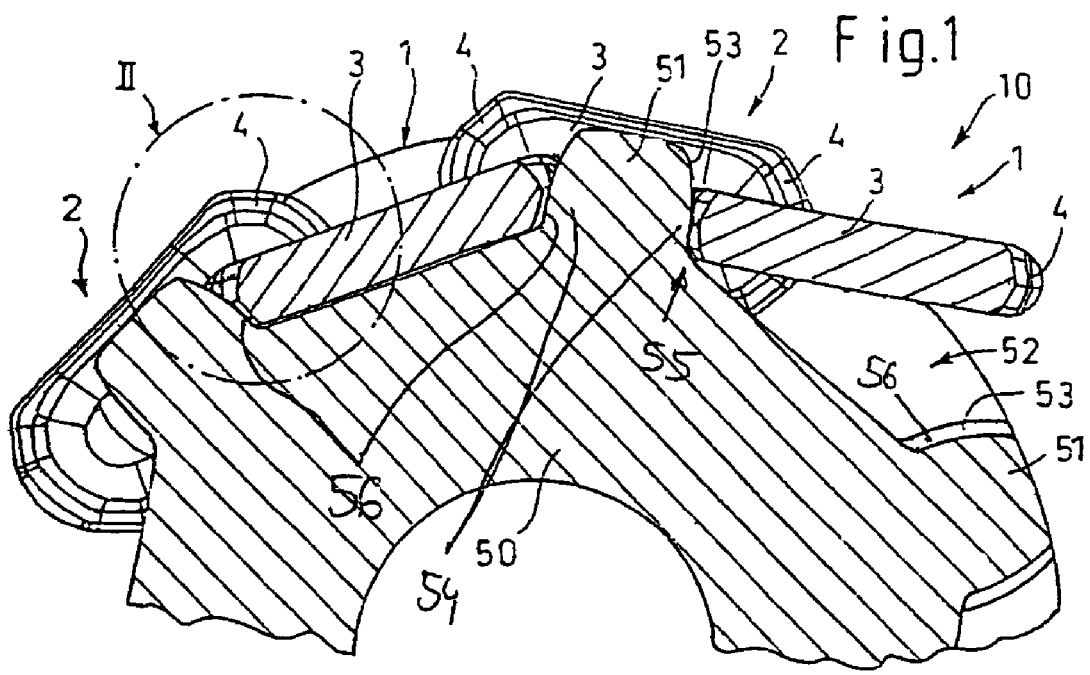
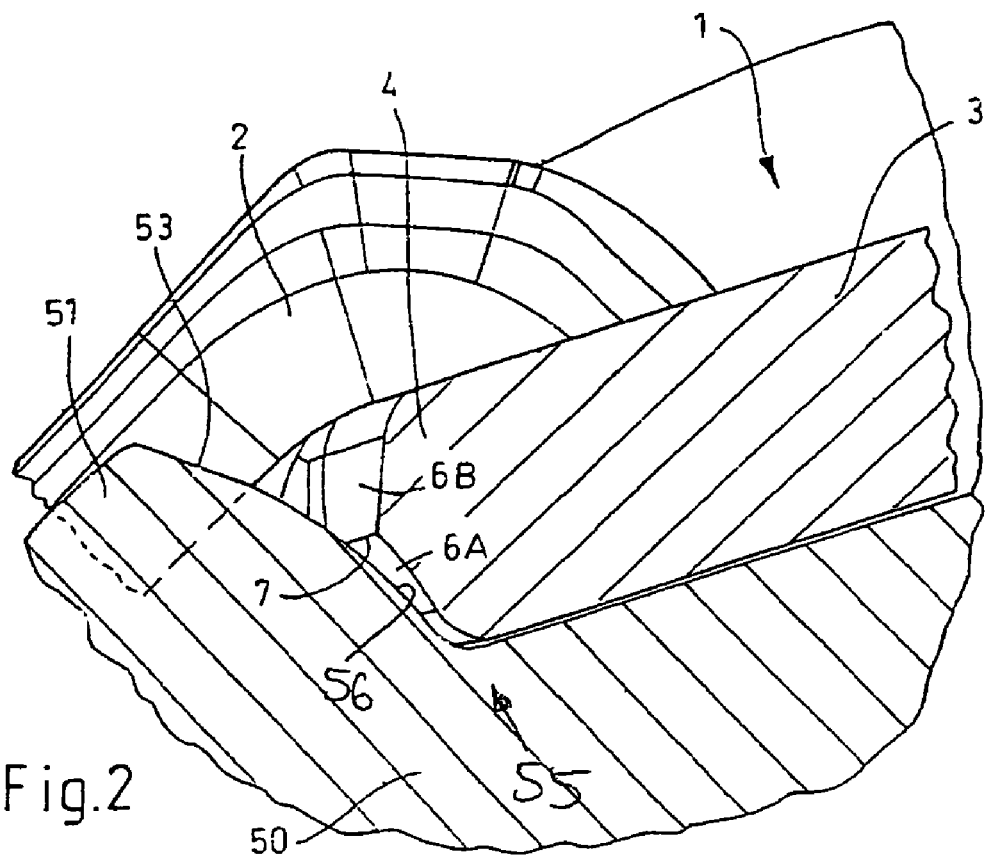

CHAIN DRIVE OR RETURN ARRANGEMENT AND CHAIN ASSEMBLY AND SPROCKET EMPLOYED THEREIN

The invention relates to a chain drive or return arrangement for chain-drawn winning or transport facilities, particularly in underground mining, for example for plow winning systems or scraper chain conveyors, with a sprocket and a chain assembly returned and possibly driven by the sprocket, with the chain assembly consisting of vertical chain links and horizontal chain links and the sprocket exhibiting a plurality of sprocket teeth arranged uniformly around its circumference and chain link pockets between each pair of adjacent teeth that are delimited by tooth flanks of the sprocket teeth and each take up a horizontal chain link of the chain assembly, these horizontal chain links exhibiting bows that form the power transmission zone when the horizontal chain links engage in the chain link pockets of the sprocket, these bows being arrow-shaped and exhibiting bow flanks to both sides of a curved bow center section. The invention also relates to a chain assembly in particular for plow systems in underground mining with vertical chain links and horizontal chain links that exhibit bows that in operative use of the chain assembly form power transmission zones with sprockets, these bows being arrow-shaped and exhibiting bow flanks to both sides of a curved bow center section. Finally the invention also relates to a sprocket for chain-drawn winning or transport facilities with a plurality of sprocket teeth arranged uniformly around the circumference of the sprocket and with chain link pockets between each pair of adjacent teeth, said pockets each taking up a horizontal chain link of a chain assembly, with the chain link pockets being delimited by tooth flanks of the sprocket teeth.

In underground mining, the forces induced in the drive chain(s) of a winning plow or transport system increase constantly due to the ever-growing demands on the winning performance, thus increasing the loads on the individual chain links. This makes particular demands on the design, especially when constructing plow chain assemblies, as these have to be drawn through chain guides over the whole length of the face and necessitate an optimization of the chain geometries. In order to achieve this, the demand is to design the chain links for high carrying and tensile forces, but at the same time to achieve the smallest possible enveloping circle for the chain links. The horizontal chain links of the chain assemblies at least for equipment driven in both directions, such as for example a coal plow, must be fitted with identically designed bows at their two opposite head ends in order to be able to bear the same load in both directions of operation.

While for example the maximum enveloping circle of the chain or of the chain links forming the chain generally poses no problem with scraper chain assemblies for scraper chain conveyors as the chain assembly can normally travel in the open runs of a scraper chain conveyor, chains are used for the plow chain assemblies of modern winning equipment that are optimized in particular with respect to the design of their horizontal chain links. Apart from the demands for the smallest possible enveloping circle with a given load-bearing capacity of the chain, particular attention has to be paid to the design of the horizontal chain links in the area of their bows and the associated contact surfaces at the teeth of the sprockets, as it is a known fact (DE 196 10 935 A1) that the power transmission surfaces at the bows of the horizontal chain links can be subject to very high contact pressures, in particular due to the linear contact between the bow flanks and the teeth of the sprockets, that can result in disproportionate wear of the bows due to flattening or notching ("duck's tails"). DE 196 10 935 A1 therefore proposes for round-link chains for transport and winning systems in under-ground mining and tunnel construction the use of horizontal and vertical chain links whose bows are arrow-shaped and exhibit flattened bow flanks between a curved bow center section which enclose an angle of approx. 100° between the flanks and are subject to smaller contact pressures during operational use due to the large overlap of the flattened, fully bearing flanks, allowing an increase in the service life of the round-link chains. With this known chain type in particular, the legs can be formed as laterally protruding arrow overhang flanks that create a frame to permit a favorable power transmission and load with a bow exhibiting an obtuse angle.

The object of the invention is to create an arrangement of the type described at the beginning and a chain assembly and sprocket used for this purpose that allow high chain tensile forces to be absorbed and to be transmitted between sprocket and chain assembly with the risk of bow wear on the chain bows of the horizontal chain links and on the sprocket teeth of the sprocket interacting with the latter being significantly reduced compared with the prior-art arrangements, and in which despite a particularly high performance of the arrangement according to the invention, the chain assembly exhibits only a small enveloping circle and is thus particularly suitable also for use in high-performance plow systems.

This object is achieved with the arrangement according to the invention in that the bow flanks of the horizontal chain links have a concave trough form at least below an equatorial line and that the tooth flanks delimiting the chain link pockets have a convex crown shape matching said bow flanks, at least in the contact areas of the sprocket teeth with the horizontal chain links. The chain assembly according to the invention is consequently characterized in that the bow flanks of the horizontal chain links have a concave trough form at least below an equatorial line and it is a characteristic of the sprocket according to the invention that interacts with such a chain assembly that the tooth flanks delimiting the chain link pockets have convex crown contact surfaces at least in the contact areas of the sprocket teeth with the horizontal chain links.

The concave trough of the bow flanks of the horizontal chain links of the chain assembly and the matching convex crown curvature of the contact surfaces at the tooth flanks of the sprocket returning the chain assembly allow exceptionally favorable surface pressures to be achieved between the contact surfaces on the sprocket and the horizontal chain links, as a linear contact between the two interconnecting parts is extensively avoided. This enables higher chain tensile forces to be transmitted without increasing the risk of damage to the chain assembly or the sprocket at the contact surfaces.

The vertical chain links of the chain assembly expediently each consist of two parallel legs and identical bows on each side connecting the legs. A particularly advantageous embodiment is obtained if the bow flanks of the horizontal chain links have concave troughs both above and below the equatorial line and thus the horizontal chain links have a symmetrical design relative to the equatorial line, so that the chain can be installed with its horizontal chain links in any orientation.

In a preferred embodiment of the invention, the bow flanks extend laterally from the bow centerline only over areas lying in the axial continuation of the legs of the horizontal chain links. With this form of embodiment, the power is transmitted from the sprockets to the horizontal chain links of the chain assembly only in an area of the bow flanks that is supported or underlaid by the legs of the horizontal chain links, as it lies in the axial continuation of the legs. This results in a significant increase in the transmittable chain forces, so that the wire gage of the individual chain links can be smaller than would be necessary with generic designs of prior art horizontal chain links with bow flanks lying further inwards or extending further towards the bow centerline. As a result of the smaller wire gages that this embodiment permits, the enveloping circle of the chain assembly or of the horizontal chain links used therein is also reduced at the same time in a particularly advantageous manner. In adaptation to this particularly advantageous design of the bow flanks of the horizontal chain links, the crown convex curved contact surface formed on both sides of the space to receive a vertical chain link of the sprocket according to the invention can extend over areas lying in the axial continuation of the legs of a horizontal chain link held in the chain link pocket.

It is also advantageous if the bow centerline of the horizontal chain links extends over roughly one half of the chain link width and each bow flank extends over roughly one quarter of the chain link width. In adaptation hereto, the contact surfaces of the sprocket according to the invention can each extend over a width corresponding to roughly one quarter to one third of the chain link width of a horizontal chain link. The bow flanks of the horizontal chain links are preferably troughed with a curvature corresponding exactly or at least approximately to the curvature of the convex curved contact surfaces at the tooth flanks of the sprockets, thus making the surface pressures in the contact zones or force introduction zones particularly small.

In a preferred further development of the invention, the bow flanks leave a free angle in the middle of roughly 48°-56°, preferably roughly 52°. Furthermore, the bows of the horizontal chain links preferably exhibit a circular cross-section on the bow centerline and/or the legs of the horizontal chain links are formed with slightly crowned flat surfaces on the outsides and with semi-spherical surfaces on the insides.

In a chain assembly in which the chain links on the bow centerline have a diameter of roughly 38 mm, the horizontal chain links can have a chain pitch of roughly 137 mm and an overall length of roughly 213 mm with a chain link width of roughly 97 mm. With this chain link width, the bow flanks then extend over a width of roughly 24 mm and the bow centerline over a width of roughly 49 mm and/or the bow flanks enclose an angle of less than 110°, in particular an angle of roughly 102°±2°.

In a particularly favorable embodiment of the invention, the horizontal chain links and vertical chain links can be of identical design, so that the chain assembly can be placed onto the sprocket in any orientation during installation and after a certain period of operation of the arrangement according to the invention, the chain assembly can also be fitted again after being turned through 90° and advanced by one chain link in order to turn the vertical chain links that have previously been subjected to a comparatively slight load into horizontal chain links and hence to subject all the chain links to a uniform load and to uniform wear over the period of operation of the chain assembly.

As already indicated, it is expedient that the sprocket teeth are designed as twin teeth with tooth halves arranged in pairs between which a space to take a vertical chain link is provided, both tooth halves then exhibiting convex crown curved contact surfaces. It is furthermore particularly advantageous if the sprocket teeth or their tooth halves are provided on their outer sides alongside the contact areas with reinforcements that at least partially laterally delimit the adjacent chains pockets and significantly improve the stability of the sprocket teeth. In particular for transport facilities such as scraper chain conveyors, a design has proved advantageous in which the reinforcements each extend just slightly beyond the contact areas in circumferential direction towards the respective next tooth so that the chain link pockets between the reinforcements of two adjacent sprocket teeth remain open at the sides so that coal dust or the like cannot settle to any noticeable extent in the chain link pockets. For plow systems in which the chain assembly and also the sprockets are subject to reversing and frequently also impact loads, but where the risk of the chain link pockets becoming filled with coal dust or the like is far lower than with conveyors, an embodiment has proved to be effective in which the reinforcements of consecutive sprocket teeth or tooth halves in circumferential direction have a transition into one another and form laterally delimiting side walls for the chain link pocket between the two. This provides optimum stability and wear resistance of the sprocket. If the sprocket teeth or their tooth halves have at least approximately straight or plane running tooth flank areas in their radially outer tooth tip area, this simplifies the manufacture of the sprocket and thus reduces the manufacturing costs without negatively influencing the particularly advantageous function achieved by the crowned design of the sprocket at the tooth root and the matching troughed form of the horizontal chain links at their bows.

Further advantages and embodiments of the invention can be seen from the following description of illustrative embodiments of the arrangement according to the invention shown in the drawing and of the chain assembly and sprocket employed therein. In the drawing:

FIG. 1 shows a return arrangement according to the invention for a chain-drawn winning plow with a plow chain assembly in mesh with a sprocket as a sectional view;

FIG. 2 shows a detail view II according to FIG. 1;

Figure 3:
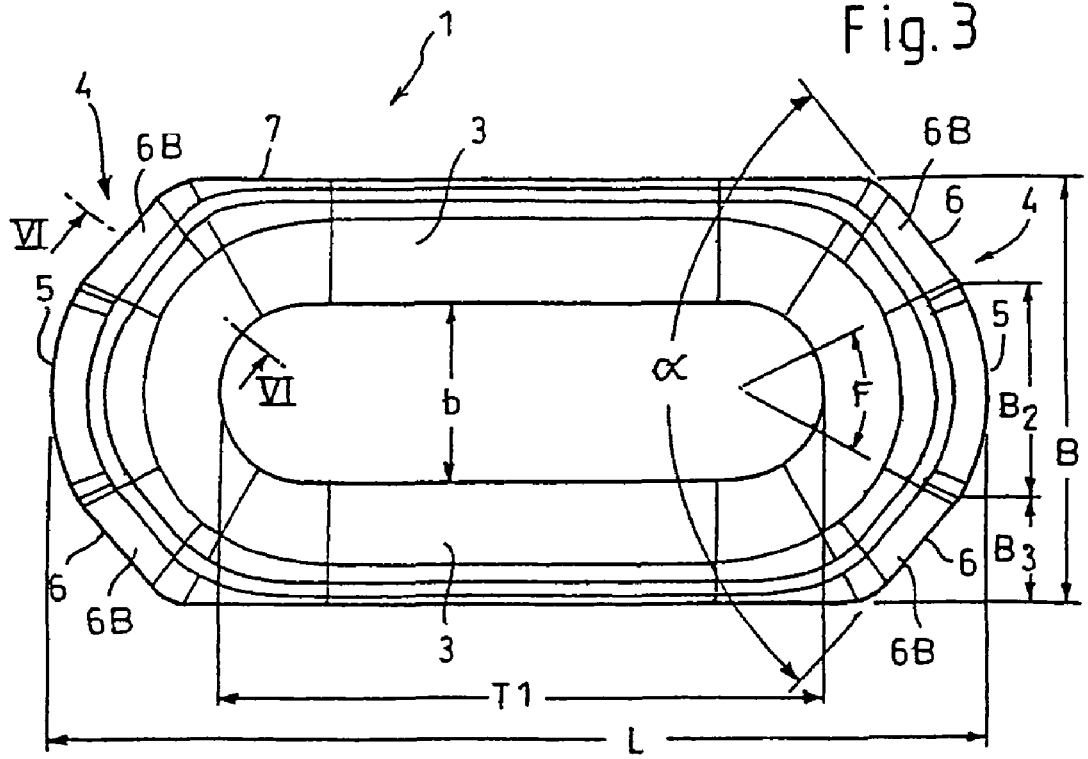
FIG. 3 shows a horizontal chain link in a top view.

FIG. 1 shows two horizontal chain links 1 and two vertical chain links 2 connecting these from a plow chain assembly referred to in its entirety with reference number 10, that in the illustrative embodiment shown have an identical form and are made as drop forgings from two mutually parallel link legs 3 and arrow-shaped chain bows 4 linking these at the head ends of the horizontal chain links 1 and vertical chain links 2. FIGS. 1 and 2 show the plow chain assembly 10 in mesh with the sprocket teeth 51 of a sprocket wheel or sprocket 50 that is driven during operation of an underground coal plow system alternately in the one and other direction of rotation by drives not further illustrated. The sprocket 50 is provided with chain link pockets 52 between two adjacent sprocket teeth 51, said pockets being delimited by the tooth flanks 53 of the teeth 51. The arrangement is such that the tooth flanks 53 bordering the chain link pockets 52 exhibit convex crown curved contact surfaces 56 in the contact areas 55 at their tooth roots 54, as will be described in further detail below. While the vertical chain links 2 pass through spaces 57 between the teeth 51 or tooth halves 51 a, b of the sprocket 50 arranged in pairs without transmitting power, the rear chain bow 4 of the horizontal chain links 1 in each case in the direction of rotation of the sprocket 50 is in contact with the contact surfaces 56 of the tooth flanks 53, as shown particularly clearly in FIG. 2. When the horizontal chain links 1 are guided by the rotating sprocket 50, the chain bows 4 roll over the contact surfaces of the tooth flanks 53. The greatest risk of damage of the bows 4 of the horizontal chain links 1 normally exists during this rolling due to (linear) pressures.

Reference is now made first to FIGS. 3 to 6, in which a horizontal chain link 1 is shown in detail. The two chain legs 3 of the horizontal chain link 1 are linked at the head ends by arrow-shaped chain bows 4 that, as shown particularly clearly in the top view in FIG. 3, exhibit an essentially circular crowned bow centerline 5, on both sides of which bow flanks 6 are formed. In the top view according to FIG. 3, the outer outline of the chain link 1 forms an equatorial line 7 that coincides with a symmetry plane at which the horizontal chain links 1 above and below the line are formed identically. In relation to the equatorial line 7, the bow flanks 6 run relative to the crowned bow centerline 5 with flat surfaces facing outwards and hereby enclose an angle a of roughly 102° at the equatorial line 7. Between the two bow flanks 6 there is a free angle F for the bow centerline of roughly 52°. The crowned bow centerline 5 extends, relative to the overall width B of the horizontal chain links 1, over a length $B_2$ corresponding to roughly 50% of the total width B, while the two bow flanks 6 extend over a width $B_3$ each corresponding to roughly ¼ of the total width B. The bow flanks lie with their complete bow flank surface 6B above the equatorial line 7 (or 6A below the equatorial line 7) in axial extension of the legs 3, so that all forces introduced to the bow flanks 6 are distributed and absorbed uniformly between the legs 3.

Figure 4:
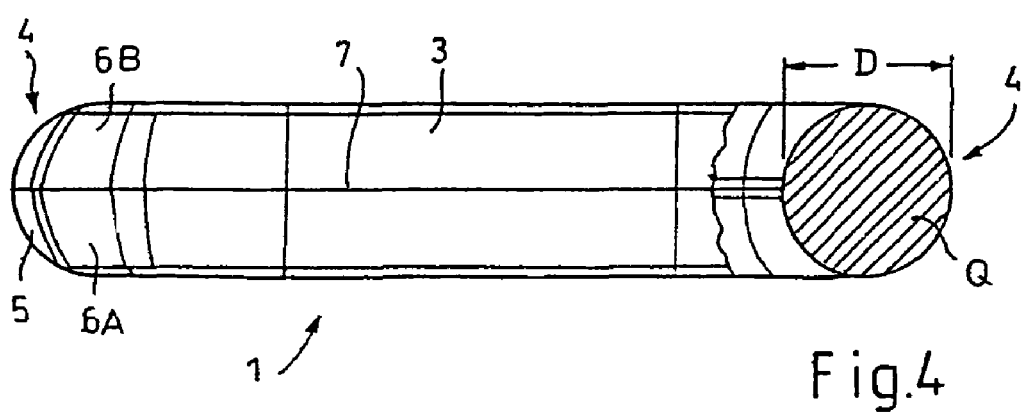
FIG. 4 shows the subject of FIG. 3 in a side view and partially in a sectional view.
Figure 5:
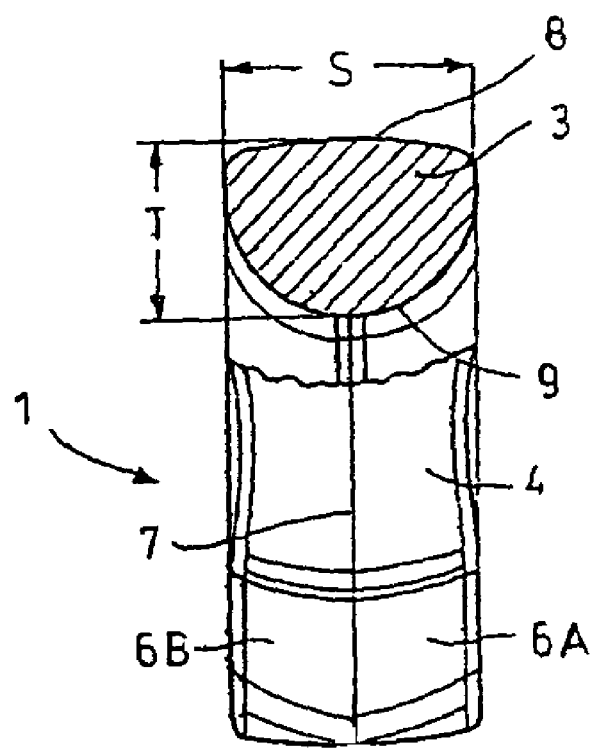
FIG. 5 shows the subject of FIG. 3 in a view towards the head end of a chain bow, partially in a sectional view.

As can be seen particularly from FIG. 4, the bow 4 in the bow centerline has a circular cross-section Q with a diameter D of, for example, 38 mm. The two legs 3 of the horizontal chain link 1, on the other hand, as can be seen particularly from FIG. 5, have crowned flat surfaces 8 on the outer side and a semi-spherical surface 9 on the inner side, so that the maximum leg thickness T between the opposed curvatures of the flat surface 8 and the semi-spherical surface 9 can be roughly 28 mm while the leg width S can be roughly 39.5 mm, so that overall maximum transmittable chain tensile forces occur, in the chain legs 3 subject to the higher loads, for which a round-link chain would require a wire diameter of roughly 42 mm with a correspondingly larger enveloping circle. The pitch $T_1$ of the horizontal chain links 1 is roughly 137 mm with an overall chain link length L of roughly 213 mm and a chain link width B of roughly 97 mm, and the inside width b between the legs 3 is roughly 41 mm, so that the vertical chain links can travel and be guided in the horizontal chain links 1 without jamming.

Figure 6:
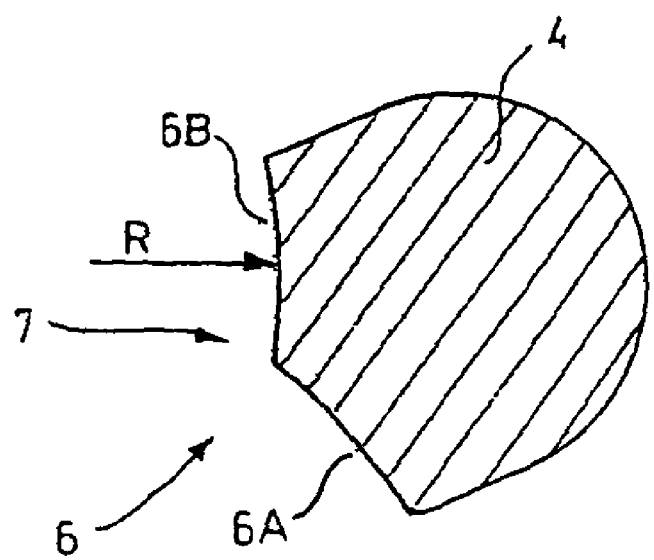
FIG. 6 shows a sectional view along line VI-VI through the horizontal chain link according to FIG. 3 in the area of a bow flank.

According to the invention, the bow flanks 6 have a concave trough form in their flank surfaces 6A, 6B—as shown with exaggerated clarity in the sectional view in FIG. 6. In the preferred embodiment shown, the concave troughed design has been realized both above and below the equatorial line 7, so that the chain can be fitted with its horizontal chain links in any orientation for rotation around the sprocket. Both concave troughed bow flank surfaces 6A and 6B have essentially the same radius of curvature R used also for the convex crown design of the contact surfaces 56 at the tooth flanks 53 of the sprocket 50 (FIG. 2). The radius of curvature R can be varied here over the height of the chain links or the contact surfaces and does not have to be constant.

Figures 7, 8:
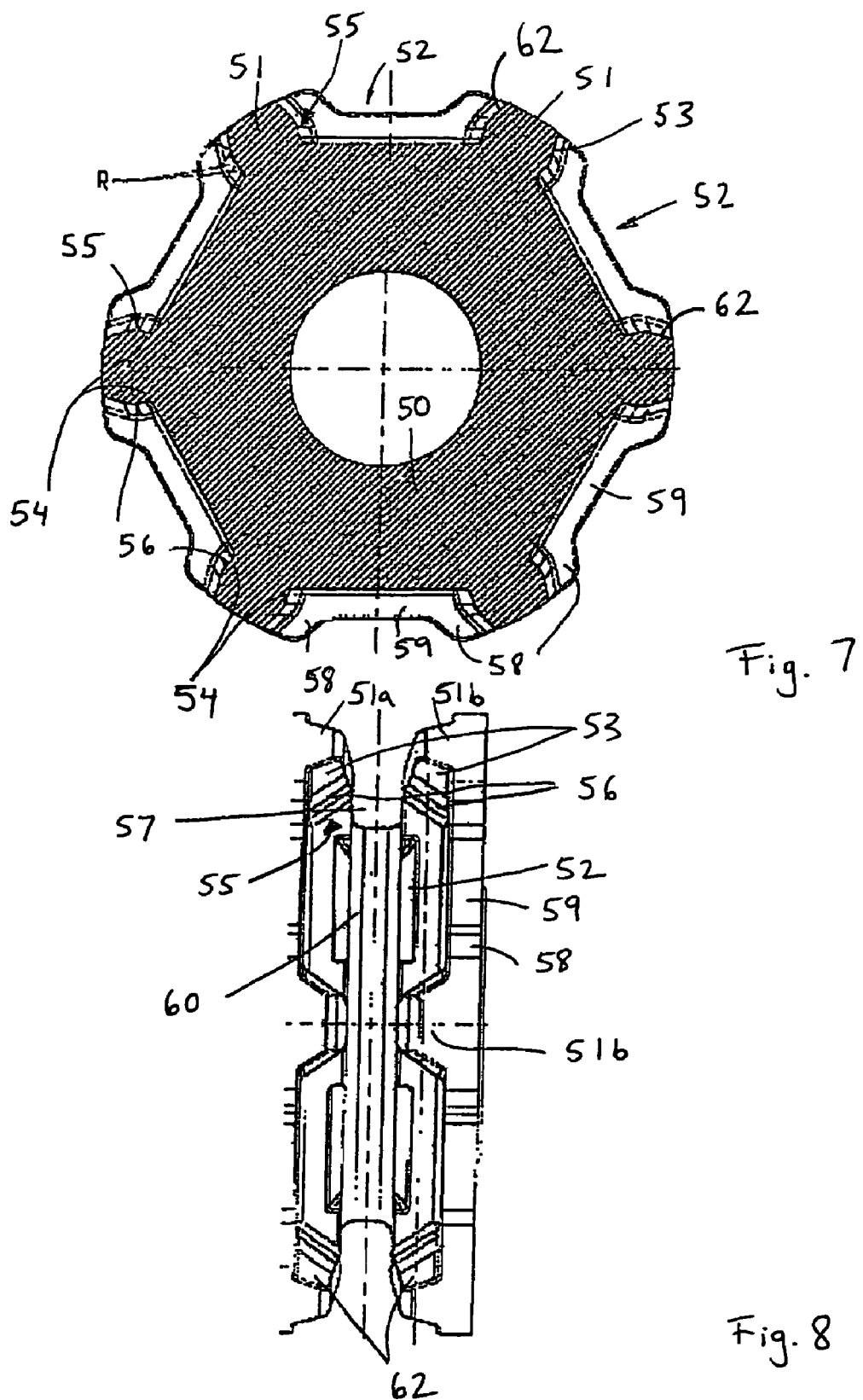
FIG. 7 shows a first embodiment of the sprocket according to the invention in a vertical section at right angles to the sprocket axis.
FIG. 8 shows the subject of FIG. 7 in a view in direction VIII.

FIGS. 7 to 10 show two illustrative embodiments of the sprocket according to the invention in more detail and without showing the chain guided by the sprocket. The sprocket as shown in FIGS. 7 and 8 represents the preferred embodiment employed for plow systems where particular demands are made on the stability and rigidity of the sprocket, and in particular on the sprocket teeth, due to the reversing operation of the winning plow driven by the plow chain and the high impact loads during travel of the plow. Consequently the sprocket teeth 51 or their tooth halves 51a, b arranged in pairs are provided with reinforcements 58 on their outer sides alongside the contact areas 55, which reinforcements laterally delimit the chain link pockets 52 formed between each pair of sprocket teeth. The arrangement in this embodiment is such that the reinforcements 58 of consecutive pairs of sprocket teeth or tooth halves in circumferential direction have a transition into one another and hence form side walls 59 that laterally delimit the chain link pocket 52 formed between the two respective teeth. The chain link pockets are therefore essentially closed here at the sides and at the root of the pocket 60 and open only at their outer circumference, resulting in a particularly high stability of the sprocket 50 and hence reliable operation of the plow chain even under high load peaks and non-uniform load during the plow travel through the face. Due to the convex crown-shaped contact surfaces 56 at the tooth flanks of the sprocket teeth and the matching concave troughed form of the bow flanks of the horizontal chain links, these have not only contact with the sprocket teeth over a comparatively large contact area when they are fully engaged in one of the chain link pockets (cf. in FIG. 1 the left-hand one of the two horizontal chain links shown), but also when they are being lifted out of a chain link pocket or being placed into the pocket (cf. in FIG. 1 the right-hand one of the two horizontal chain links shown). This characteristic of the invention can be seen particularly well in FIGS. 1 and 2. Thanks to the crowned design on the one hand of the contact surfaces at the tooth flanks of the sprocket and on the other hand at the bow flanks of the chain links, a comparatively large contact area between the two interacting parts of the arrangement and hence a comparatively low surface pressure is guaranteed at all times.

Figure 9:
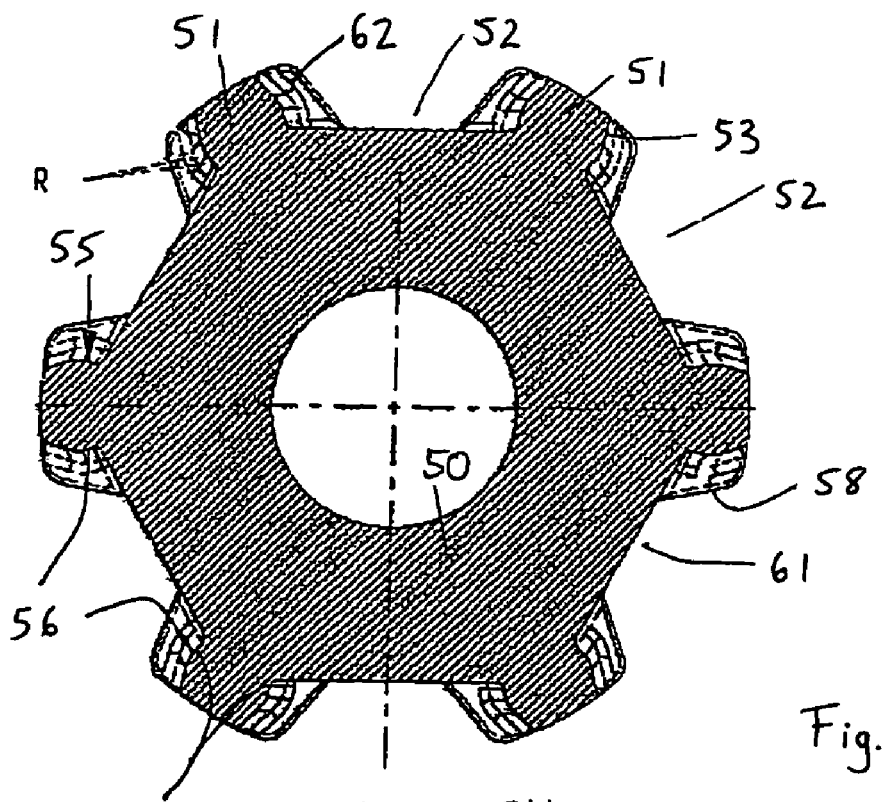
FIG. 9 shows a second embodiment of the sprocket according to the invention in a view corresponding to FIG. 7.
Figure 10:
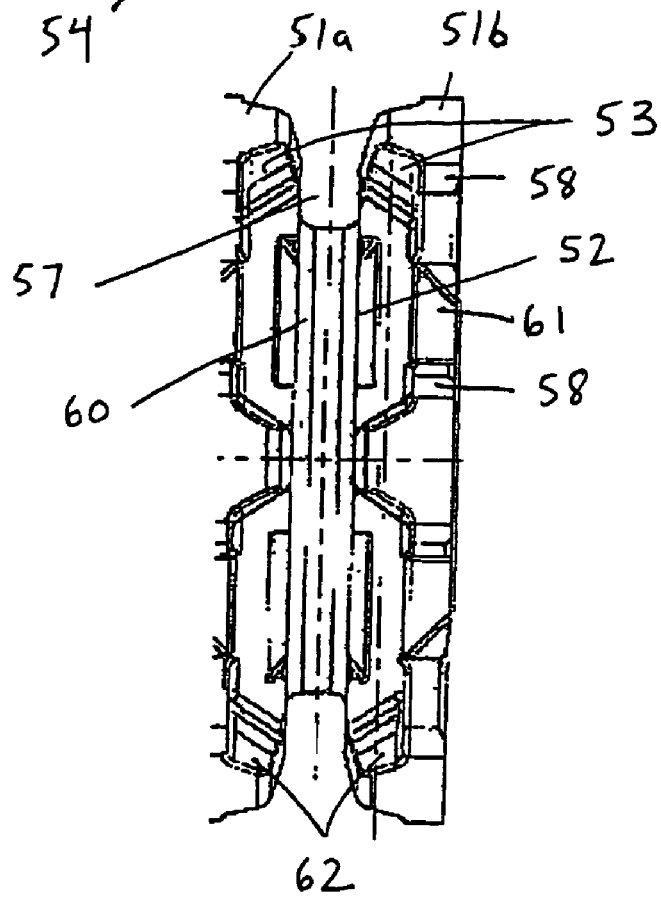
FIG. 10 shows the subject of FIG. 9 in a view along the line 10.

FIGS. 9 and 10 show a sprocket according to the invention as it is preferably employed for transport facilities in underground mining, and thus in particular for scraper chain conveyors. This sprocket differs from the embodiment shown in FIGS. 7 and 8 essentially in that the reinforcements 58 of the sprocket teeth do not form continuous side walls between two consecutive teeth or tooth pairs, rather the teeth merely extend slightly in circumferential direction on the outside alongside the contact areas so that the chain link pockets 52 in between remain open at the sides in their middle section, as can be clearly seen at reference number 61. The laterally open design of the chain link pockets has the advantage that coal dust cannot easily settle in the chain link pockets and can be easily removed from the pockets again if coal dust should actually have settled in this area after prolonged operation of the conveyor.

Both on the sprocket according to FIGS. 7 and 8 and on the sprocket shown in FIGS. 9 and 10, the radially outer tooth tip area exhibits at least approximately straight or plane running tooth flank areas 62, i.e. the tooth flanks here are not crowned as in the tooth root area, but rather form essentially flat surfaces, thus simplifying the manufacture of the sprocket and so making it also cheaper, without negatively influencing the function of the sprocket.

The previous description will reveal numerous modifications to a person skilled in the art that should be covered by the scope of the attached claims. The dimensions indicated in the description refer to a preferred illustrative embodiment for horizontal chain links with a wire gage at the bow centerline of 38 mm. Correspondingly different dimensions can result from larger wire gages. The vertical chain links can also exhibit a form deviating from that of the horizontal chain links.

The invention claimed is:

1. Chain drive or return arrangement for chain-drawn winning or transport facilities, suitable for use with underground mining involving the use of plow winning systems or scraper chain conveyors, comprising:
    a sprocket; and
    a chain assembly returned or driven by the sprocket,
    wherein the chain assembly comprises:
        vertical chain links; and
        horizontal chain links, and
    wherein the sprocket comprises:
        a plurality of sprocket teeth arranged uniformly around its circumference; and
        chain link pockets between each pair of adjacent teeth, the pockets being delimited by tooth flanks of the sprocket teeth and configured for taking up a horizontal chain link of the chain assembly,
    wherein the horizontal chain links include bows that form a power transmission zone when the horizontal chain links engage in the chain link pockets of the sprocket,
    wherein the bows each include bow flanks linearly tapered towards each other in a first plane, the bow flanks being on opposite sides of a curved bow center section,
    wherein the bow flanks of the horizontal chain links have a concave trough in a second plane, the second plane being orthogonal to the first plane the concave trough being formed at least below an equatorial line, and
    wherein the tooth flanks delimiting the chain link pockets have a convex curved shape matching said bow flanks, at least in contact surfaces of the sprocket teeth with the horizontal chain links.

2. Chain drive or return arrangement according to claim 1, wherein the vertical chain links each include two parallel legs and identical bows on each side connecting the legs.

3. Chain drive or return arrangement according to Claim 2, wherein the bow flanks on a side of a bow centerline extend only over areas lying in an axial continuation of the legs.

4. Chain drive or return arrangement according to claim 1, wherein the bow flanks of the horizontal chain links have concave troughs both above and below the equatorial line.

5. Chain drive or return arrangement according to claim 1, wherein a bow centerline extends over roughly one half of a chain link width and each bow flank extends over roughly ¼ of the chain link width.

6. Chain drive or return arrangement according to claim 1, wherein the bow flanks are troughed with a curvature corresponding roughly to a curvature of the tooth flanks of the sprockets.

7. Chain drive or return arrangement according to claim 1, wherein a free angle between the bow flanks is roughly in a range of 48° to 56°.

8. Chain drive or return arrangement according to claim 1, wherein the bows of the horizontal chain links exhibit a circular cross-section on a bow centerline.

9. Chain drive or return arrangement according to claim 1, wherein the horizontal chain links include legs that are formed with surfaces on their outsides that are flat in one direction and curved in another direction and with semi-spherical surfaces on their insides.

10. Chain drive or return arrangement according to claim 1, wherein the horizontal chain links with a chain diameter of 38 mm have a chain pitch of roughly 137 mm, an overall length of roughly 213 mm and a chain link width of roughly 97 mm.

11. Chain drive or return arrangement according to claim 1, wherein the bow flanks enclose an angle a of less than 110°.

12. Chain drive or return arrangement according to claim 1, wherein the horizontal chain links and the vertical chain links are of identical design.

13. Chain drive or return arrangement according to claim 1, wherein the bow flanks exhibit a radius of curvature at least approximately corresponding to a radius of curvature of the tooth flanks in the contact surfaces.

* * * * *